(12) United States Patent
Brown et al.

(10) Patent No.: US 12,477,336 B2
(45) Date of Patent: Nov. 18, 2025

(54) COLLECTING AND MANAGING ACCESS TO MANAGEMENT DATA IN A TELECOMMUNICATIONS NETWORK

(71) Applicant: Microsoft Technology Licensing, LLC, Redmond, WA (US)

(72) Inventors: Michael Anthony Brown, McKinney, TX (US); Bahareh Sadeghi, Vancouver, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 307 days.

(21) Appl. No.: 18/297,358

(22) Filed: Apr. 7, 2023

(65) Prior Publication Data
US 2024/0340646 A1    Oct. 10, 2024

Related U.S. Application Data

(60) Provisional application No. 63/437,576, filed on Jan. 6, 2023.

(51) Int. Cl.
*H04L 67/1097*    (2022.01)
*G06Q 30/0283*    (2023.01)
*H04W 12/08*    (2021.01)

(52) U.S. Cl.
CPC ........ *H04W 12/08* (2013.01); *G06Q 30/0283* (2013.01); *H04L 67/1097* (2013.01)

(58) Field of Classification Search
CPC ............... H04W 12/08; G06Q 30/0283; H04L 67/1097
See application file for complete search history.

(56) References Cited

U.S. PATENT DOCUMENTS

| | | | |
|---|---|---|---|
| 2013/0028392 A1* | 1/2013 | Croot ................. | H04L 43/0829 379/9 |
| 2016/0241429 A1* | 8/2016 | Froehlich ............ | H04L 41/0631 |
| 2018/0205635 A1* | 7/2018 | Kim ...................... | G06F 16/182 |
| 2019/0286832 A1* | 9/2019 | Szeto ................. | H04W 12/082 |

* cited by examiner

*Primary Examiner* — Viet D Vu
(74) *Attorney, Agent, or Firm* — Ray Quinney & Nebeker P.C.; James S. Bullough

(57) ABSTRACT

The present disclosure relates generally to collecting and managing access to management data associated with operation of components (e.g., network functions) on a telecommunications network environment (e.g., a $3^{rd}$ Generation Partnership Project (3GPP) environment). The present disclosure involves an architecture and framework for collecting management data associated with the operation of components on the telecommunications network. The systems described herein manage access to the management data for any number of consumer entities that request access to any of a variety of types of management data. The systems described herein are implemented on a core network and provide functionality related to storing and accessing management data in a cellular network (e.g., a fifth generation (5G) telecommunications network).

19 Claims, 7 Drawing Sheets

COLLECTING AND MANAGING ACCESS TO MANAGEMENT DATA IN A TELECOMMUNICATIONS NETWORK

CROSS-REFERENCE TO RELATED APPLICATIONS

This application is related to and claims the benefit of a U.S. Provisional Patent Application Ser. No. 63/437,576, filed Jan. 6, 2023, the entirety of which is hereby incorporated by reference.

BACKGROUND

A cloud computing system refers to a collection of computing devices capable of providing remote services and resources. Indeed, cloud computing systems can provide a variety of services including storage, databases, networking, software, and analytics services. The use of cloud computing technology has grown rapidly in recent years. This is due at least in part to the development of high-capacity networks as well as reduced costs for computers and storage devices.

Broadly speaking, a cloud computing system includes two sections, a front end and a back end, which are in communication with one another via the internet. The front end includes the interface that users encounter through a client device. The back end includes the resources that deliver cloud-computing services, including processors, memory, storage, and networking hardware. These resources are connected by one or more communication networks. Advantageously, the group of networked elements providing services does not have to be individually addressed or managed by users. Instead, the entire provider-managed suite of hardware and software can be thought of as a "cloud."

The back end of a cloud computing system typically includes one or more datacenters. A datacenter is a physical facility that is used to house computing systems and associated components. A datacenter typically includes a large number of computing systems (e.g., servers), which can be stacked in racks that are placed in rows. An entity that owns and/or operates a cloud computing system can be referred to as a cloud computing provider. A cloud computing provider can have a plurality of datacenters, and these datacenters can be located in different geographical areas.

A "private cloud" is cloud infrastructure operated solely for a single organization, whether managed internally or by a third party, and hosted either internally or externally. A cloud is called a "public cloud" when the services are rendered over a network that is open for public use. Generally, public cloud service providers own and operate the cloud infrastructure at their datacenters and access to users generally occurs via the Internet. A "hybrid cloud" architecture is the combination of public and private clouds by a wide area network or broadband connection.

There are many different types of services that cloud computing providers can offer to customers. One type of cloud computing service is referred to as Infrastructure as a Service (IaaS). IaaS is a form of cloud computing that delivers compute, network, and storage resources to consumers on-demand, over the Internet. IaaS enables end users to scale and shrink resources on an as-needed basis, reducing the need for large, up-front capital expenditures. This can be particularly beneficial for users who anticipate having variable workloads.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

DETAILED DESCRIPTION

Figure 1A:
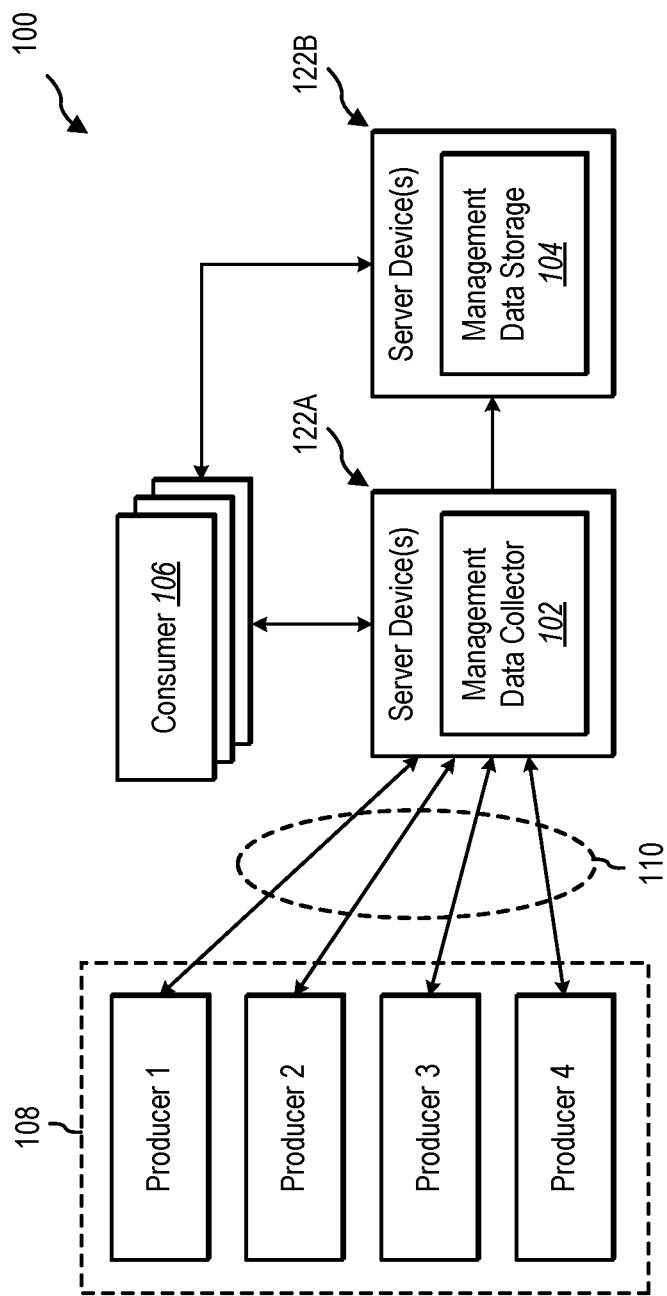
FIG. 1A illustrates an example environment including a management data collector in accordance with one or more embodiments.

The present disclosure relates generally to systems, methods, and computer-readable media for collecting and managing access to management data associated with operation of components (e.g., network functions) on a telecommunications network environment (e.g., a $3^{rd}$ Generation Partnership Project (3GPP) environment). The systems described herein involve an architecture and framework for collecting management data associated with operation of components on the telecommunications network. The systems additionally relate to managing access to the management data for any number of consumer entities (or simply "consumers") that request access to any of a variety of types of management data. In one or more embodiments described herein, the systems described herein are implemented on a core network and provide features and functionality related to storing and accessing management data in a fifth generation (5G) telecommunications network as well as future generations of telecommunications networks.

Mobile networks have the capability to support a wide variety of services. This ability to support a variety of services, along with increasing flexibility in hosting network resources presents management and operational challenges. In addition, with movement of 5G and future generations of telecommunications networks towards automation and observability, there is a greater need for management data to be collected and consumed by various entities in the network. Indeed, a greater number of consumers are requesting access to management data than ever before.

Conventionally, obtaining access to management data typically involves any number of consumer entities requesting access to the management data produced by different management data producer(s). This often causes the same data to be transported multiple times across multiple sites of the telecommunications network resulting in high processing costs and operational expenses associated with utilizing bus services.

In addition, because different implementations of data buses exist and because data from respective sources are often ingested by different data buses in different ways, obtaining access to management data presents a variety of challenges to consumer entities that request access to different types of management data. Indeed, with different implementations of data buses (e.g., message buses) being available, interacting with data buses (even buses within the same operator network as a requesting consumer) may involve support of multiple different application programming interfaces (APIs). This lack of standardization causes problems with scaling the telecommunications network and increases the complexity in managing access to management data by a wide variety of consumer entities.

While 3GPP service and systems aspects working group two (SA2) provides an architecture specified for enabling coordination among requests for specific types of network data to prevent duplication in collection of the specific network data types, there currently does not exist a framework for coordinating and otherwise managing access to management data associated with operation of components of the telecommunications network. For example, telecommunications networks currently do not provide a mechanism to coordinate requests to access data (e.g., without duplication) associated with faults, traces, performance management data, and other types of network management data (or simply "management data").

The features and functionalities described herein provide a number of advantages and benefits over conventional approaches and systems. For example, the systems described herein provide features and functionality related to coordinating storage and access to network management data for efficient and optimal transportation of data on components of a data bus. Indeed, the systems described herein provide an architecture including data coordination functionality which ensures efficient collection and transport of data on the bus.

In addition to providing efficient transportation of data, the systems described herein include features related to managing how network management data is placed or otherwise maintained on the data bus. For example, the systems described herein can consider factors, such as relevant topics, specific sources of the data, location(s) of the requesting entities, and other factors in determining placement of data at a particular location of the data bus.

Moreover, the systems described herein facilitate management of a storage function that provides access to various consumer entities without requiring that each of the types of data and/or implementations of the data bus be accessed via a different protocol or interface. Indeed, as will be discussed below, the systems described herein provide a storage function that stores the management data in a manner that is accessible via one or more standardized APIs (e.g., APIs defined by one or more telecommunications network standards, such as 3GPP standards).

Additional example benefits include reducing nuisance and complexity caused by multiple implementations of data buses that each use different APIs providing access to management data. Indeed, frameworks described herein provide a standardized approach to maintaining and making management data accessible via a bus. This reduces complexity of conventional systems and reduces the amount of translation conventionally performed in accessing management data.

As illustrated in the foregoing discussion, the present disclosure utilizes a variety of terms to describe features and advantages of the systems herein. Additional detail is now provided regarding the meaning of some example terms.

As used herein, a "management data producer" or a "Management Service Producer" (MnS Producer) is a network entity capable of producing management data. Management data may be produced by any entity. For example, management data may be produced by a Network Function(s) (NF), such as radio network function(s) and/or core network function(s). In another example, management data may be produced by a network management function (s). The management data producer may produce, for example, performance management data, configuration management data, and fault supervision data.

As used herein, "network management data" or simply "management data" refers to data that is obtained from a variety of sources on a telecommunications network and which is used in management and orchestration of the telecommunications network. In one or more embodiments, management data refers to data that is collected to manage operation of the framework as well as optimize management of network resources. Examples of management data include, but are not limited to, performance measurement data (e.g., faults, alarms), trace information, key performance indicators, radio access network (RAN) data, and external management data (e.g., any data that is not specified by 3GPP and can be used for management of the network). Management data is distinguishable from network data generally where network data refers more specifically to activity of one or more network functions, including the status of operation and functionality the network functions provide. In one or more embodiments, management data refers to how the data is used, such as in management and orchestration of the telecommunications network (as noted above). As discussed herein, management data may originate from a plurality of different sources. In one or more embodiments, management data is specified by 3GPP specifications. For example, in one or more implementations, management data specified by 3GPP for 5G management is classified into 5G performance measurements as defined by TS 28.552, 5G end to end key performance indicators as defined by TS 28.554, and trace/MDT data as defined by TS 32.422.

Consistent with one or more examples discussed above, the management data may refer to raw or unprocessed management data as received from a data producer (e.g., unprocessed management data as it is received from the producer). Alternatively, in one or more embodiments, management data refers to processed management data (e.g., data obtained based on calculations or processing performed on the management data as collected from the producer(s)). Processed management data may include machine learning model(s) based on the unprocessed management data, report(s) created using the unprocessed management data, or analytic data performed on the unprocessed management data.

In one or more embodiments, the management data may be consumed by an entity, which may in turn produce the management data to other entities. As a non-limiting example, management data may be initially produced by a network function, provided to and/or consumed by a network management function, and further provided to a third entity for further processing (e.g., an analytics function or service). In this example, the first entity (e.g., the network function) may first produce unprocessed management data that the network management function consumes. The network management function may then create a report using said unprocessed management data and produce it to a third entity, such as an analytics service.

In one or more embodiments, management data refers to one of internal management data or external management data. As used herein, internal management data refers to any data defined as management data in a corresponding technical specification (e.g., 3GPP specification) defining standards and functionality provided by the telecommunications network. In one or more embodiments described herein, the management data refers to data defined as management data by 3GPP technical specification 28.532. Nevertheless, management data as defined by other technical specifications may similarly be used in characterizing data as internal management data. Conversely, as used herein, external management data refers to data that is used for management and operation of the telecommunications network that is not explicitly specified by 3GPP. For example, external management data may be produced by data sources of a different nature (e.g., sensors) with different formats. In one or more embodiments, the internal management data may be enriched by external data to provide additional input for network optimization and prediction. Both the internal management data and the external management data may be stored by a management data storage.

A "consumer entity" or "consumer" or "management service consumer" (MnS consumer) may refer to any authorized consumer that is allowed to request and obtain access to some portion of management data managed by the systems described herein. For example, a consumer may refer to a network function that requests access to management data. As an illustrative example, a consumer may refer to a management data analytics function (MDAF) on a cloud computing system. Another example of a consumer may be a network data analytics function (NWDAF). A further example of a consumer may be an AI/ML models (or simply "machine learning models," as used in various examples herein) that collect data over a period of time for training and/or AI implementation purposes. A consumer may refer to a local consumer, such as a consumer entity implemented on an edge network. A consumer may refer to a remote consumer, such as a consumer entity implemented on a datacenter of the cloud computing system. A consumer may refer to a network function on a core network of the telecommunications network. Indeed, a consumer may refer to any entity that requests access to management data. Additional examples of consumers will be discussed in connection with examples provided below.

In one or more embodiments described herein, a telecommunication network environment may refer to a standardized telecommunication network. The telecommunication network environment may include a radio access network, core network, cloud infrastructure, and any other regions of collections of components that enable consumers to utilize various services of a cloud infrastructure. One or more embodiments described herein refer specifically to a 5G or other 3GPP communication environment. Nevertheless, features described herein in connection with consumer entities, cloud native management entities, and cloud infrastructure management systems may be applicable across a wide variety of communication environments, and are not necessarily limited to the specific 5G or other 3GPP standard environments discussed in connection with specific examples herein.

Additional details will now be discussed in connection with example figures that illustrate various features and functionalities of the systems described herein. For example, FIG. 1A illustrates an example environment 100 showing features of systems described herein. FIG. 1A illustrates an environment 100 including management data producers 108 (e.g., sources of management data), a management data collector 102 implemented on one or more server device(s) 122A, a management data storage 104 having a data storage (e.g., a local and/or remote storage) implemented on one or more server devices 122B, and any number of consumers 106 requesting access to management data produced by the management data producers 108.

As noted above, the management data collector 102 may facilitate collection of management data from any number of management data producers 108 (e.g., producers 1-4). As many different consumers 106 can request network functions (NF) or network management functions to produce management data it is beneficial to coordinate management data requests to optimize management data production and delivery.

In one or more embodiments, the management data producer 108 contains a list of consumers with their management data requirements. This list may include information about the type of management data required, the specified time window during which the management data is required, the formatting requirement in which they require the management data, and the identity of the requesting consumer. In one or more embodiments, the management data producer 108 coordinates the management data collection. Coordinating management data collection may include various functionalities such as determining if the requested management data is stored on a management data storage, determining if the requested management data is already being collected, determining if a request to collect the data should be sent to the management data producer, selecting the optimum path to deliver the management data, providing configuration instructions to a data bus on how to format and process the outgoing management data sent to the consumer, and preventing any overlap in collecting management data. These functionalities will be discussed in further detail in connection with FIG. 5.

Each of the management data producers 108 shown in FIG. 1A may generate and provide management data of different types and quantities as well as different frequencies. For example, a first producer may provide a stream of management data as the management data is generated. A second producer may provide chunks of management data at less frequent intervals. A third producer may provide management data upon request of the management data collector and/or in response to some other trigger events. A fourth producer may provide management data in other forms, quantities, or frequency (or some combination of the above-examples). In one or more embodiments, the producers 108 communicate with the management data collector 102 via respective APIs that define rules and policies associated with the coordinating the collection of the management data.

As shown in FIG. 1A, the environment 100 includes a number of consumers 106. As will be discussed below, the consumers may refer to any entity requesting access to the management data collected from the sources and/or maintained on the management data storage. In one or more embodiments described herein, the consumer entities refer to network functions on a cloud computing system (e.g., a core network of the cloud computing system) requesting access the management data. For example, the consumer 106 may be a management data analytics function (MDAF)

as further discussed in connection to FIG. 1B. The MDAF may provide Management Data Analytics Services (MDAS) for one or more network function (NF), network slice subnet instance (NSSI) and or network slice instance (NSI). The MDAF may run different analytics on the collected management data as further defined in 3GPP TS 28.533. In another example, the consumer 106 may be a network data analytics function (NWDAF). The NWDAF may also run their own analytics on the collected management data as further defined in 3GPP TS 23.288. In one or more embodiments, the management data collector 102 may receive a request from the consumer(s) 106 and facilitate access to the management data at a particular location on a data bus.

Figure 1B:
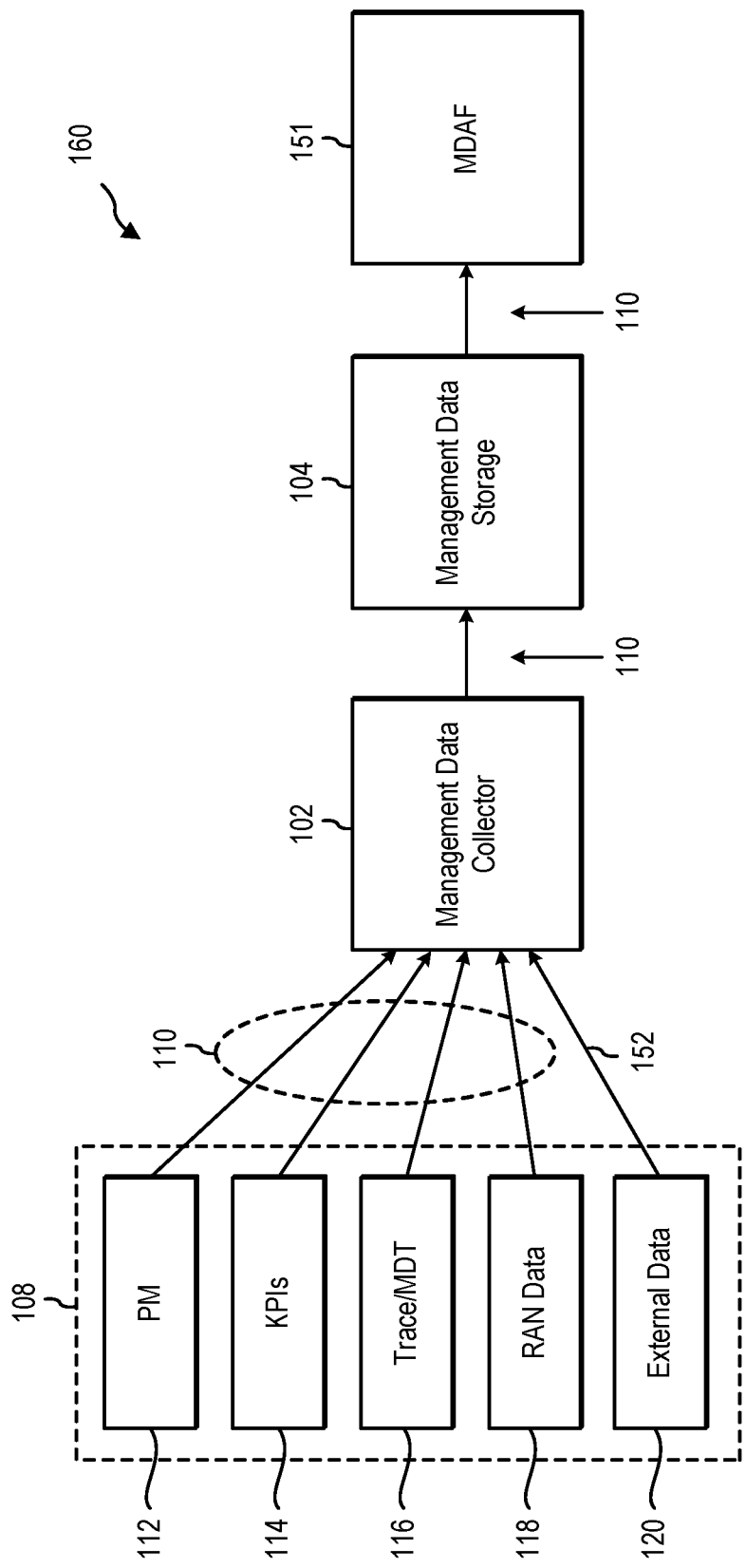
FIG. 1B an example workflow showing implementation of the management data collector and management data storage in accordance with one or more embodiments.

As shown in FIGS. 1A-1B, and as will be discussed in further detail below, the management data collector 102 may communicate with a management data storage 104 to provide access to management data to any number of consumers 106. In one or more embodiments, the management data storage 104 includes or communicates with a data bus (further discussed in connection to FIG. 3) that is accessible by the consumer(s) 106. Additional information about the management data storage 104 will be discussed below.

In one or more embodiments, the management data storage 104 may store some or all of the collected management data (e.g., historical data). In one or more embodiments, the management data storage 104 may store training models built with machine learning-enabled functions(s) using the management data as a training data. In one or more embodiments, the management data storage 104 stores analytics of the management data. For example, the management data storage 104 may store reports of analytics performed on the management data.

In one or more embodiments, a consumer 106 may request management data from the management data collector 102. For example, the consumer 106 may subscribe to receive particular management data periodically, or based on a change of event. In another example, the consumer 106 may make a one-time request to receive a particular management data. The management data collector 102 may first determine if the management data requested is already collected and stored by the management data storage 104. If the management data requested is not already available at the management data storage 104 the management data collector 102 may then determine if the management data requested is already being collected by the management data collector 102. If the management data requested is already being collected by the management data collector 102, the management data collector 102 adds the requesting consumer to the list of management data consumers that are subscribed for the requested data. If the management data requested is not already being collected by the management data collector 102, the management data collector may request the management data from the specific management data producer 108.

In one or more embodiments, the management data producer 108 may be a network function (NF), cloud infrastructure, or radio access network (RAN). In one or more embodiments, the management data collector 102 may make a one-time request to receive the particular management data. In another embodiment, the management data collector 102 may subscribe to receive the particular management data periodically or based on a change of event. For example, when a new output management data is available, the management data producer 108 may send the data to the management data collector 102 automatically. In one or more embodiments, the management data collector 102 may store the management data to management data storage 104.

For example, the consumer 106 may request the management data to be stored to the management data storage 104. In yet another example, the management data collector 102 configurations may require the management data to be stored to the management data storage 104. When a consumer 106 no longer wants the management data to be collected it may inform the management data collector 102 that it wants to unsubscribe from the management data. The management data collector 102 may then remove the consumer from the list of consumers subscribed to that management data and reconfigure the data bus accordingly. If there are no other management data consumers 106 subscribed to that management data, the management data collector 102 may unsubscribe with the management data producer 108.

As shown in FIG. 1A, and as will be discussed in further detail below, the management data collector 102 may communicate with a management data storage 104 to provide access to management data to any number of consumers 106. In one or more embodiments, the management data storage includes or communicates with a data bus that is accessible by the consumer(s). Additional information about the management data storage will be discussed below.

As shown in FIG. 1A, the environment 100 includes a number of consumers 106. As will be discussed below, the consumers 106 may refer to any entity requesting access to the management data collected from the producers 108 and/or maintained on the management data storage 104. In one or more embodiments described herein, the consumers 106 refer to network functions on a cloud computing system (e.g., a core network of the cloud computing system) requesting access to the management data. In one or more embodiments, the consumer may request management data for improving network performance and efficiency. In one or more embodiments, the management data collector may receive a request from the consumer(s) and facilitate access to the management data at a particular location on a data bus.

While additional environmental details will be discussed in connection with FIGS. 1B-6, it will be understood that components of the environment 100 illustrated in FIG. 1A may be implemented in a variety of computing environments. For example, in one or more embodiments, the environment 100 may be implemented on a cloud computing system. In one or more embodiments, the environment 100 is implemented in whole or in part on a core network of a telecommunications network (e.g., a cellular communication network). In one or more embodiments, the environment 100 is implemented in part on the radio access network of the telecommunications network. In one or more embodiments, the environment 100 is implemented in part on a cloud computing system, in part on a core network or a telecommunications network, and in part on a radio access network of the telecommunications network. In one or more embodiments, the components shown in FIG. 1 are implemented in a fifth generation (5G) or other 3GPP communication network in which network functions and other consumer entities would benefit from obtaining access to management data and where coordination of placement of the management data would be beneficial.

Additional detail will now be given in connection with an example workflow and architecture in which the management data collector 102 manages access to management data received from a variety of management data producers 108 and maintained on a management data storage 104.

In particular, FIG. 1B illustrates an example workflow 150 including a plurality of management data producers 108 (e.g., a performance management data producer 112, a key performance indicator producer 114, trace information and/or minimization of drive test (MDT) information producer 116, RAN data producer 118, and an external data producer 120.

More specifically, FIG. 1A illustrates an example environment 100 for ingestion and control of management data generated in a 3GPP network. The workflow shown in FIG. 1A depicts collection and storage aspects of the architecture that facilitates the features and functionality of the management data collector 102 and other components described herein. At a high level, the management data collector 102 refers to an entity tasked with collection and control of management data requests.

As shown in FIG. 1A, the management data collector 102 receives requests for a particular management data as a management service provider. In one or more embodiments, this is a similar functionality as a management service provider as defined in 3GPP technical standards (TS) 28.532. Upon receiving the request, the management data collector 102 may authenticate and check authorization of the consumer entity 106 requesting the management data to determine whether the requesting consumer has permission to request and/or access the management data. Depending on access rights and security settings, the consumer entity 106 may be subject to restrictions regarding the management data they can access.

The management data collector 102 may additionally evaluate whether the requested management data is already collected from the respective management data producers 108. Where the management data is already collected, the management data collector 102 may determine a transport path over a data bus that may be used in providing access to management data by the consumer entity 106 while minimizing a cost associated with use of the data bus. The management data collector 102 may consider additional processing, bandwidth, and resource costs in determining a location of the management data placed on the data bus.

In determining location of the management data on the data bus (or simply "bus"), the management data collector 102 may prioritize reducing unnecessary collection and transportation of the data over the bus. In addition, the management data collector 102 may interface with the management data storage 104 to inquire whether the data is stored thereon, in which case, the management data storage 104 may be identified as the source of data. In one or more embodiments, determining the transport path includes causing (e.g., requesting) the management data storage 104 to place the data on the bus. The management data collector 102 may additionally provide an identification of the storage location (e.g., on the management data storage 104) to facilitate access to the stored management data to the requesting consumer 106.

In addition, where the management data is not yet collected or only partially collected, the management data collector 102 may trigger an interaction directly with the management data producer 108 (e.g., network function(s)) or indirectly via other network elements. As shown in FIG. 1B, the interaction may be performed via 3GPP defined APIs 110 for collecting data (e.g., standardized management data) for initiating performance management (PM) jobs, trace jobs, etc. The management data collector 102 may also utilize vendor extensions (e.g., vendor-specific APIs 152) associated with collecting external data not explicitly defined by 3GPP standards.

As noted above, the management data collector 102 may facilitate delivery of the management data to the consumer(s) 106 in a variety of ways. In one or more embodiments, the management data collector 102 interacts with the management data storage 104, which refers to one or more of a network function, a defined role, and/or service(s) of the telecommunications network to facilitate providing the stored management data to the requesting consumer 106.

In the example shown in FIG. 1B, the consumer refers to a management data analytics function (MDAF) 151. Other implementations may include any other consumer entity (e.g., other network functions) requesting access to management data. In delivering or otherwise providing access to the management data to the MDAF 151, the management data storage 104 may be standardized as a management service (e.g., a management data storage that takes the role of a management data storage provider). In one or more embodiments, the management data storage 104 services as a repository for historical management data previously collected.

As shown in FIG. 1B, in one or more embodiments, the management data storage 104 supports standardized APIs 110 (e.g., standards-defined APIs, such as 3GPP defined APIs) and interacts with a coordinating entity (discussed below) as well as directly with the bus. In one or more embodiments, the management data storage 104 is a direct or indirect recipient of the management data (e.g., the storage may receive data from the management data collector, from the data source(s), and/or from the bus. In one or more embodiments, management data collected by other consumers 106 may be duplicated and stored in the management data storage 104. Storing management data enables reusage of management data for multiple management purposes. For example, machine learning models need input data collected over a certain period of time for training purposes. In one or more embodiments, a specific set of collected management data may serve different purposes and can therefore be input to multiple machine learning services, or for multiple different consumers. For example, management data collected in a geographical area may be used also for another geographic area when the scenarios in the two areas are statistically similar. In one or more embodiments, the MDAF 151 utilizes management data collected from the network (both unprocessed and processed management data) and performs analytic functions based on the collected information. For example, the information can be used to optimize network performance, and predict and prevent failures of the network.

Figure 2:
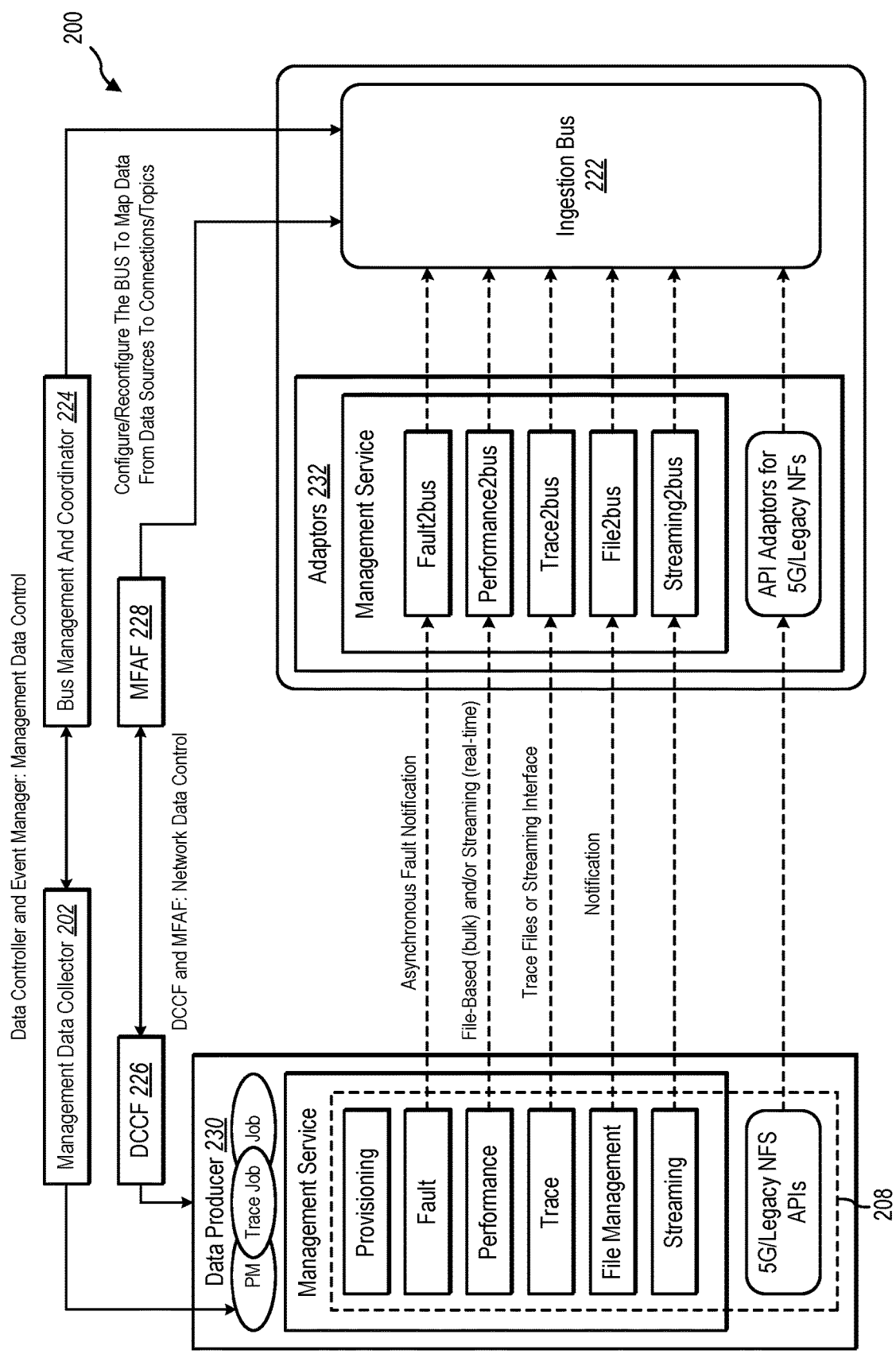
FIG. 2 illustrates an example environment showing implementation of the management data collector in managing access to management data generated by a plurality of sources in accordance with one or more embodiments.

Additional details in connection with an example implementation will be discussed in connection with FIG. 2. In particular, FIG. 2 illustrates an example environment 200 including a management data collector 202 that provides similar features as the management data collector 102 discussed above in connection with FIGS. 1A-1B. As shown in FIG. 2, the environment 200 additionally includes a bus management and coordinator 224, a data collection coordinator function (DCCF) 226, a messaging framework adapter function (MFAF) 228, data producer 230 (both management data and network data producers), adaptor components 232, and an ingestion bus 222.

As shown in FIG. 2, the management data collector 202 interacts with the bus 222 via the bus management and coordinator 224. As further shown, the management data collector 202 interacts with the data producer 230 to trigger collection of various types of management data from the respective management data producers 208. For example, similar to one or more embodiments described above, the data producer 230 includes a plurality of data producers including the management data producers 208 previously discussed in connection to FIGS. 1A-1B, as well as network data producers.

As discussed above, the respective data producers 230 may refer to management data producers 208 that provide different types of management data, such as RAN data (e.g., data associated with various RAN components), core data (e.g., data associated with various core network components), fault data (e.g., indications of detected faults), and any other type of management data associated with management or operation of various components on the telecommunications network. In addition to different types of data, the components of the data producer 230 may provide different types of data feeds. For example, the management data may be collected asynchronously (e.g., as certain events are detected or based on an independent schedule determined by the respective data producer), file-based or bulk packages of data that are transmitted periodically or based on the management data reaching some threshold size. In one or more embodiments, the management data is provided via a stream or constant feed including indications of any number of events to be included within a data stream.

As noted above, each of the feeds of management data may be collected by interacting with the data producers 230 via respective APIs. In one or more embodiments, the management data collector 202 interacts with the data producers 230 via the APIs. As shown in FIG. 2, the data producer 230 may provide management data to a series of adaptors on the adaptors component 232.

The adaptors component 232 may include adaptors for facilitating ingestion of the management data to the ingestion bus 222 (or simply "bus"). For example, the adaptor component(s) 232 may include a plurality of adaptor components for each of the management data producers 208 that are configured to convert the received management data into a format that can be accessed via a standard API from the management data storage (shown in FIG. 3) and/or bus management and coordinator 224. As shown in FIG. 2, each of the data producers 230 may be associated with a corresponding adaptor on the adaptor component 232. In addition, while not shown in FIG. 2, the 5G/legacy NFS APIS may refer to one or multiple external data producer that each have corresponding adaptors configured to convert any management data (e.g., external management data) into a format that can be ingested on the bus 222 and made accessible to one or more requesting consumers via a standardized API.

As noted above, the environment 200 may include an MFAF 228. The MFAF 228 may refer to an entity defined in conventional 3GPP architecture for network data analytics. As shown in FIG. 2, the MFAF 228 may interact with the DCCF 226 via a 3GPP defined API while interacting with the messaging framework via APIs that are understandable by the messaging framework. In one or more embodiments, the MFAF 228 provides an interface that enables network data consumers and other entities within the environment 200 to interact with the bus 222. As a result, any entity that employs the DCCF 226 will not need to support a plurality of different bus implementation.

As further shown in FIG. 2, in one or more embodiments, the management data collector 202 interacts with the bus management and coordinator 224 via a standardized API. This provides an alternative to a current framework in which multiple APIs corresponding to a variety of bus implementations would be needed for the management data collector 202 to interact with the respective implementations of the bus 222.

In one or more embodiments, the bus management and coordinator 224 may receive configuration instructions from the management data collector 202 on how to format and process the outgoing management data sent to the consumers. For example, the management data collector 202 may configure or reconfigure the bus management and coordinator 224 to map management data or management data analytics from management data producers 108 to connections or topics within the bus 222.

In response to the instructions the bus management and coordinator 224 may provide the consumer with an access to the management data via a bus 222 after formatting and processing of the management data as requested. In one or more embodiments, in response to the instructions the bus management and coordinator 224 may provide fetch information to the consumers via the bus 222 on how and where to fetch the requested management data. In one or more embodiments, the management data collector 202 may support reconfiguring the bus management and coordinator 224 to stop sending management data or stop providing fetch information to the consumers.

This provides an alternative to a framework in which multiple APIs corresponding to a variety of bus implementations would be needed for the management data collector 202 to interact with the respective implementations of the bus. In one or more embodiments, in response to receiving configuration and/or reconfiguration instructions from the management data collector 202 the bus management and coordinator component configures and/or reconfigures the bus 222 to map management data from management data producers 208 to connections or topics within the bus 222.

As noted above, the bus management and coordinator 224 (in some implementations, an event coordinator) may organize how the data is placed on the bus 222. For example, the bus management and coordinator 224 may determine where management data is placed on the bus 222 prior to receiving any requests or, alternative, in response to the management data collector 202 receiving a request. In one or more embodiments, the bus management and coordinator 224 configures the bus 222 to map management data from different data producers and different connections. The bus management and coordinator 224 may similarly map or otherwise place management data based on different topics of the management data.

Figure 3:
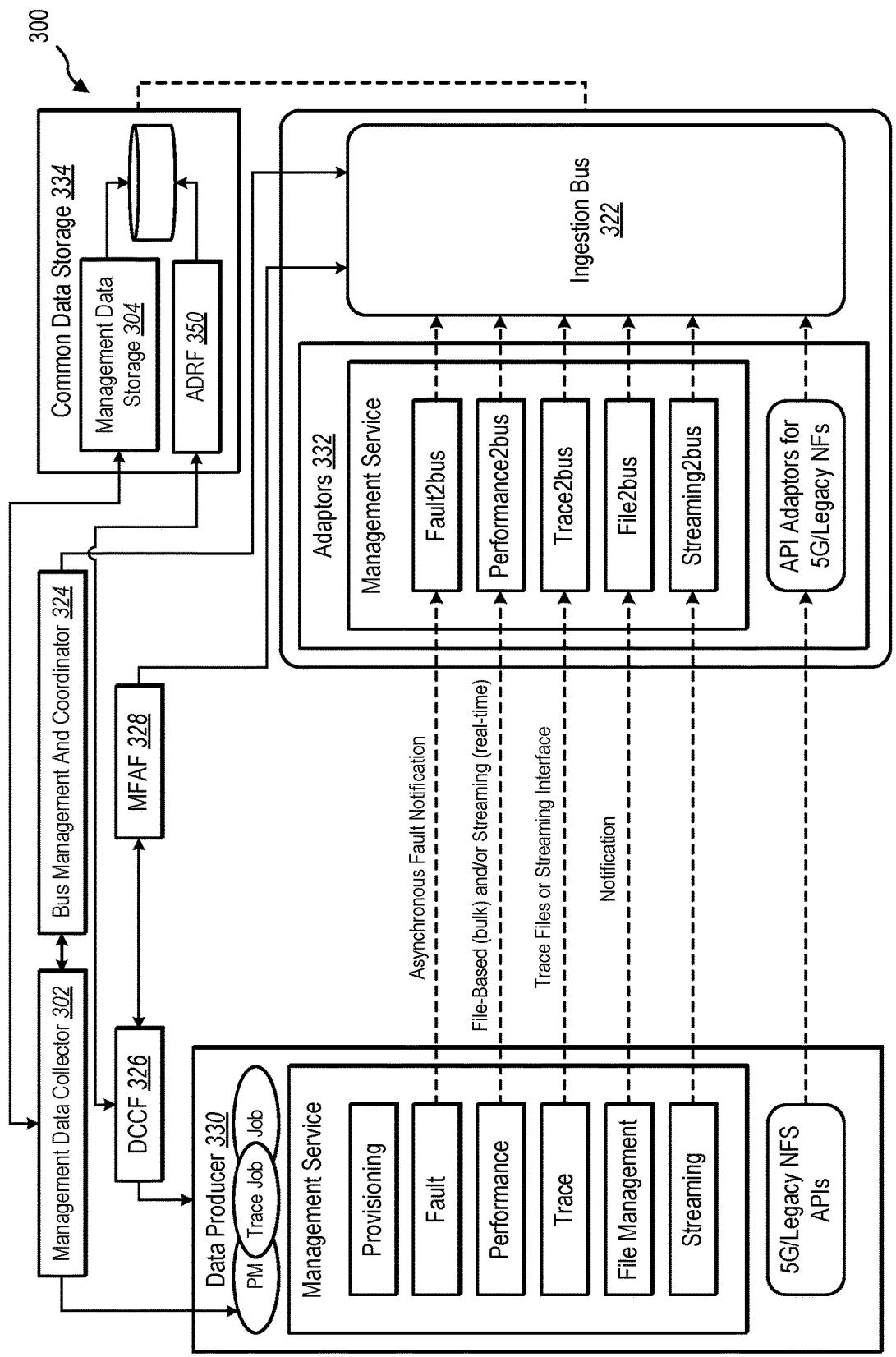
FIG. 3 illustrates another example environment showing implementation of the management data collector in managing access to management data generated by a plurality of sources in accordance with one or more embodiments.

FIG. 3 illustrates a similar implementation to the implementation discussed above in connection with FIG. 2. In contrast to FIG. 2, FIG. 3 illustrates an environment 300 that further includes a common data storage 334. In one or more embodiments, the common data storage 334 refers to or includes the management data storage 304, such as the management data storage 104 as discussed above in connection with FIGS. 1A-1B.

In particular, FIG. 3 illustrates an example architecture showing implementation of the management data storage 304 thereon. The management data placed on the bus 322 may be stored in the common data storage 334. In one or more embodiments, the management data is placed on the common data storage 334 in addition to data placed on the bus 322 (e.g., a copy of the data may be maintained on the common data storage). In one or more embodiments, the management data is placed on the common data storage 334 rather than on the bus 322. As shown in FIG. 3, the management data storage 304 may include a service or resource that exposes standardized APIs to enable access to the common data storage 334. In one or more embodiments, the bus management and coordinator 324 may receive configuration instructions from the management data collector 302 on how to format and process the outgoing management data sent to the consumers. For example, the management data collector 302 may configure or reconfigure the bus management and coordinator 324 to map management data from the common data storage 334 to connections or topics within the bus 322.

As mentioned above, and as shown in FIG. 3, the common data storage 334 may provide similar features and functionality as the management data storage 104 discussed above. As shown in FIG. 3, the common data storage 334 may include an analytics data repository function 350 (ADRF). The ADRF 350 may include storage of network data and results of analytics performed on the network data.

In connection with both FIGS. 2 and 3, while the dashed arrows represent data being transmitted between the data producer, adaptors, and ingestion bus, the arrows may represent various APIs that enable the respective components to interact with one another. One or more of the APIs may refer to currently specified 3GPP APIs (e.g., included within one or relevant 3GPP standards). One or more of the APIs may refer to non-standard or APIs that are not currently defined in any specific 3GPP standards.

Figure 4:
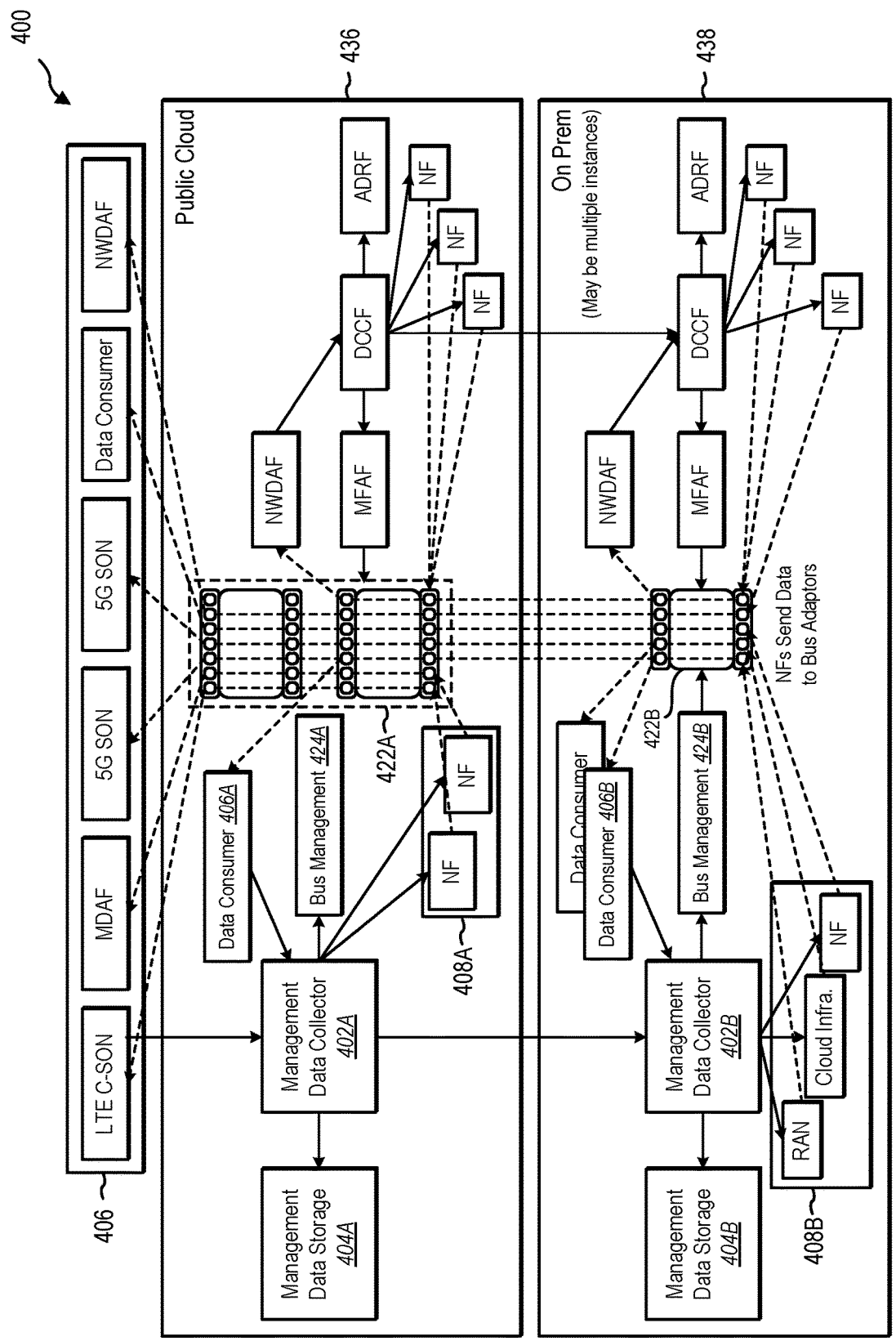
FIG. 4 illustrates a distributed implementation of the systems described herein for collecting and managing access to management data in accordance with one or more embodiments.

FIG. 4 illustrates another example implementation of various systems described herein. For example, FIG. 4 illustrates an example environment 400 in which the management data collector (402A, 402B), management data storage (404A, 404B), and a bus management entity (424A, 424B) (e.g., the bus management and coordinator) are implemented across multiple networking environments of a cloud computing system.

As shown in FIG. 4, the environment 400 includes a public cloud portion 436, which may include any components of the cloud computing system that are implemented on one or more datacenters or other remote network of devices. As further shown, the environment 400 includes an on-premise portion 438, which may include any components of the cloud computing system that are implemented on a local network, such as an edge network or collection of one or more edge servers. While FIG. 4 illustrates a single public cloud portion 436 and a single on-premise portion 438, the environment 400 may include any number of on-premise portions 438. The public cloud portion 436 may additionally include components implemented on one or across multiple datacenters.

As shown in FIG. 4, the environment 400 includes one or more management data collectors (402a, 402B), one or more bus management entities (424A, 424B) (e.g., bus management and coordinators), and one or more management data storages (404A, 404B).

The management data collector (402A, 402B) may include similar features as example management data collectors 102, 202 and 302 discussed above in connection with FIGS. 1A-3. In addition, the bus management and coordinator entity (424A and 424B) may include similar features as the bus management and coordinator 224 and 324 discussed above. Further, the management data storage entity (404A, 404B) may include similar features as the management data storage 104, 204, 304 and/or common data storage 334 components discussed above in connection with additional examples. As further shown, the environment 400 includes buses (422a, 422B), which may share similar features as data buses 222 and 322 discussed above.

As shown in FIG. 4, a wide variety of consumer entities (406, 406A, 406B) may be implemented remotely, across the public cloud 436, and on-premise 438 that may request access to management data. Examples include, but are not limited to, those consumer entities (406, 406A, 406B) shown in FIG. 4, including long term evolution (LTE) self-organizing network(s) (C-SON), MDAFs, 5G SON, Non-real-time (non-RT) RAN intelligent controller (RIC), a data consumer, and network data analytics function(s) (NWDAF(s)). As further shown, the environment 400 may include a variety of management data producers (408A, 408B) including, by way of example, RAN components, cloud infrastructure components, and network functions (NFs).

As shown in FIG. 4, the environment 400 may include similar components on both the public cloud portion 436 and the on-premise portion 438. Indeed, these similar components may provide similar functionality to the examples and implementations described herein. For example, the management data collector 402B on the on-premise portion 438 may handle requests that are provided by a consumer entity 406B located on the on-premise portion 438 of the environment 400. Conversely, the management data collector 402B may handle requests that are provided by consumer entities 406A located on the public cloud 436.

In alternative embodiments, the management data collector (402A, 402B) may be omitted from one of the respective portions. For example, in one or more embodiments, the management data collector 402A is implemented exclusively on the public cloud 436. Alternatively, in one or more embodiments, the management data collector 402B is located on the on-premise portion 438 of the cloud computing system. In one or more embodiments, there may be one or more management data collectors 402A in the public cloud 436, and/or one or more management data collectors 402B on the on-premise portion 438.

In one or more embodiments, the similar components may coordinate with one another in processing incoming requests. For example, in one or more embodiments, the management data collector 402B on the on-premise portion 438 (e.g., an on-premise instance of the management data controller) may receive a request and determine that the management data associated with the request is located (or optimally located) on the bus 422A found on the public cloud 436 portion of the environment 400. In this example, the management data collector 402B on the on-premise portion 438 may coordinate with the management data collector 402A on the public cloud 436 portion to process the request and provide access to the relevant management data. Conversely, the management data collector 402A on the public cloud 436 may coordinate with the management data collector 402B on the on-premise portion 438 to place management data on the bus 422B implemented on the on-premise portion 438 of the environment 400.

Similar cooperation may occur between additional components of the example environment 400 (e.g., between public-cloud instances and on-premise instances of various components shown in FIG. 4). For example, the management data storage 404B may include management data stored exclusively on the on-premise 438 storage or, alternatively the management data storage 404A may include management data stored exclusively on the public cloud 436 storage. In one or more embodiments, the management data storage (404A, 404B) facilitates efficient access to management data by maintaining a copy of the management data on the respective storage.

In one or more embodiments, the environment 400 refers to a distributed (e.g., a hybrid) implementation of the systems described herein. For example, the environment 400 shows an example architecture for managing collection and access to management data in addition to management of network data on both the on-premise 438 and public cloud 436 portions of the cloud computing system.

In one or more embodiments, the management data is managed and handled centrally in the cloud (e.g., on the public cloud portion) or in a distributed manner. In a distributed manner example, the management data collected on-premise 438 can be controlled locally via local instances of the management data collector 402B as well as the bus management and coordinator 424B. In one or more embodiments, management data is stored in a local storage 404B (e.g., a local instance of the common storage) as well. The management data may be sent via bus-to-bus connections from the on-premise bus 422B and the public cloud bus 422A to remote consumers 406 or for long-term storage of the management data on the cloud computing system.

Where there exist multiple instances of the management data collection and controller services and functionalities, one or more embodiments may include standardized APIs for interactions between the respective component instances. This standardization of APIs facilitates discovery and identification of destination management data collection and controller entities. This standardization additional facilitates forwarding management data requests as-is or modified (e.g., where the management data collector is aware of data that is collected from other management data producers and where the request can be modified to exclude a subset of data that is not available for collection).

For ease of understanding, one or more of the components on the right side of the buses 422A and 422B (e.g., as shown in the FIG. 4 and not necessarily as positioned in a physical implementation of the environment 400) may refer to components tasked with managing access to network data while components on the left side of the buses 422A and 422B refer to components tasked with managing access to management data. For example, as discussed above, the management data storage 404A and 404B, management data collector 402A and 402B, and bus management entity 424A and 424B may cooperatively manage placement of management data on the bus 422A and 422B and process requests from various consumer entities 406, 406A, and 406B requesting access to the management data.

Figure 5:
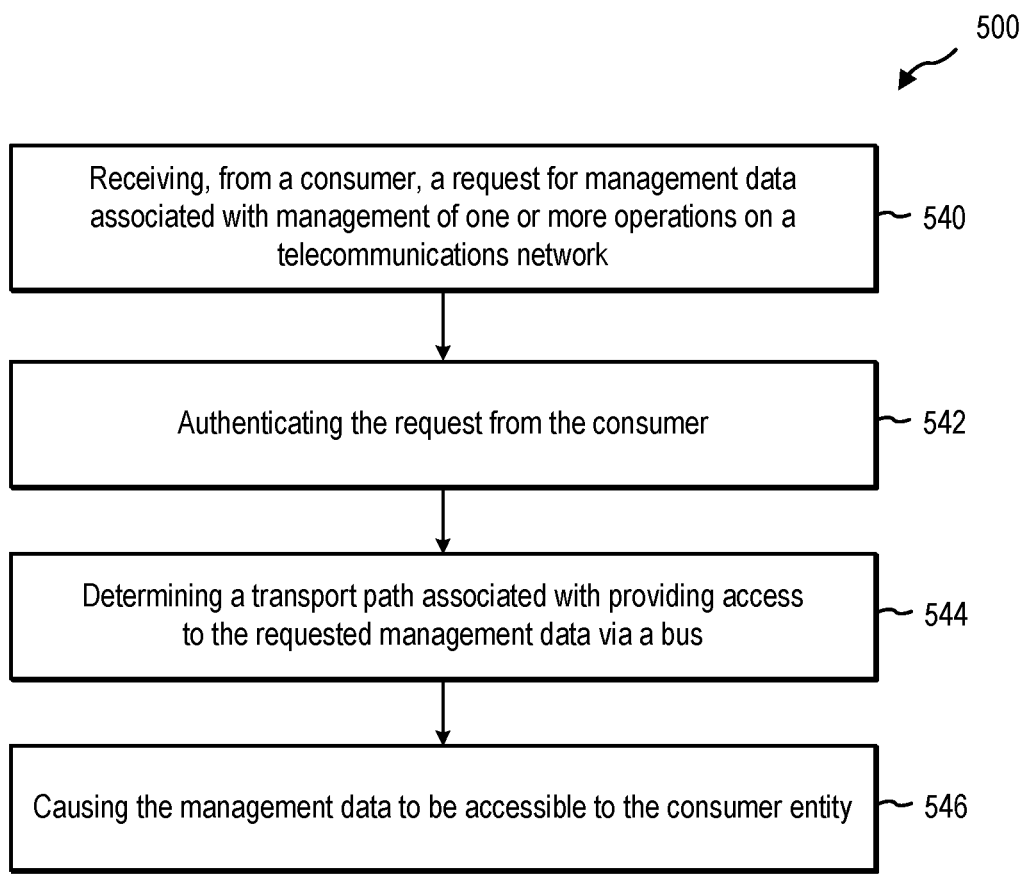
FIG. 5 illustrates an example series of acts for collecting and managing access to management data in accordance with one or more embodiments described herein.

Turning now to FIG. 5, this figure illustrates an example flowchart including a series of acts for collecting and managing access to management data in a telecommunications network. It will be appreciated that acts described herein may be performed in different orders and may include some or all of the acts described in connection with different examples. The acts described herein may be performed as part of a method. In one or more embodiments, a non-transitory computer-readable medium can include instructions thereon that, when executed by one or more processors, cause a server device and/or client device to perform the acts described herein. In one or more embodiments, a system can perform the acts described herein.

FIG. 5 illustrates a series of acts 500 for coordinating collection of and access to management data in a telecommunications network. As shown in FIG. 5, the series of acts 500 includes an act 540 of receiving, from a consumer entity, a request for management data associated with management of one or more operations on a telecommunications network. In one or more embodiments, the requested management data may be unprocessed management data, a machine learning model(s) trained with an unprocessed management data, report(s) created using an unprocessed management data, analytics data performed on an unprocessed management data, or a combination of one or more of these different types of management data. For example, in one or more embodiments, the consumer entity may request a report created using management data and newest set of management data produced by a management data producer. In one or more embodiments, the request for management data is received by a management data collector.

The series of acts 500 additionally includes an act 542 of authenticating the request from the consumer. For example, the act of authenticating the request from the consumer may include, in one or more embodiments, authenticating the consumer entity as a consumer entity who has access rights to said requested management data. In one or more embodiments, the act 542 of authenticating the request from the consumer may further include authorizing the authenticated consumer entity to access the requested management data. In one or more embodiments, the act of authenticating the request from the consumer is performed by a management data collector.

The series of acts 500 additionally includes an act 544 of determining a transport path associated with providing access to the requested management data via a bus. In one or more embodiments, the act 544 of determining a transport path may further include providing configuration instructions on how to map management data from a management data producer and/or from a management data storage to connections or topics within the bus. For example, a management data collector may select optimum path to provide access to the management data and to provide configuration instructions to bus management and coordinator on how to format and process the outgoing management data.

In one or more embodiments, the determining a transport path is based on determining a collection status of the management data associated with the request (e.g., a collection state indicating whether the requested management data has been collected and stored prior to receiving the request). For example, if it is determined that part or all of the requested management data has previously been collected and stored, a transport path to a management data storage may be configured and mapped within the bus. In another example, if it is determined that at least part of the requested management data has not been previously collected and stored a request to a management data producer to produce the requested management data is sent. In one or more embodiments, in determining whether requested management data has been previously collected may include verifying with one or more management data storages whether the one or more management data storages have stored the requested management data.

In one or more embodiments, the determining a transport path is based on the determination of whether the requested management data is already being collected. For example, if a request for a management data is first received from a first consumer, and a request to collect the management data has already been sent to the management data producer when a second consumer makes a request for the same management data, then there is no need to send a second request to the management data producer.

In one or more embodiments, the determining a transport path may further include selecting an optimum path to provide access to the management data.

The series of acts 500 additionally includes an act 546 of causing the management data to be accessible to the consumer entity. In one or more embodiments, the causing of management data to be accessible includes providing configuration instructions or reconfiguration instructions to a data bus. For example, the configuration instructions or reconfiguration instructions may include instructions on how to format and process the outgoing management data.

For example, when a first consumer requests a management data and a request is sent to a management data producer to produce the management data and a configuration instructions are provided to bus management to configure the bus according to the request and a second consumer makes a request for the same management data, a reconfiguration instructions are provided to the bus management and coordinator to reconfigure the bus to allow access to both first consumer and the second consumer.

In one or more embodiments, the configuration instructions are provided to a bus management and coordination entity by a management data collector. In one or more embodiments, the bus management and coordination entity will configure the bus according to the instructions provided by the management data collector. In one or more embodiments, causing the management data to be accessible to the consumer entity may include providing access to the management data via the bus. In one or more embodiments, causing the management data to be accessible may include providing fetching information to the consumer via the bus on how and where to fetch the requested management data. In one or more embodiments, providing access to the requested management data may include compiling the requested management data from a plurality of sources. For example, one part of the requested management data may originate from a management data producer and one part of the requested management data may originate from a management data storage. In another example, one part of the requested management data may originate from a first management data producer and one part of the requested management data may originate from a second management data producer. In yet another example, requested management data may originate from a first management data storage and one part of the requested management data may originate from a second management data storage.

Figure 6:
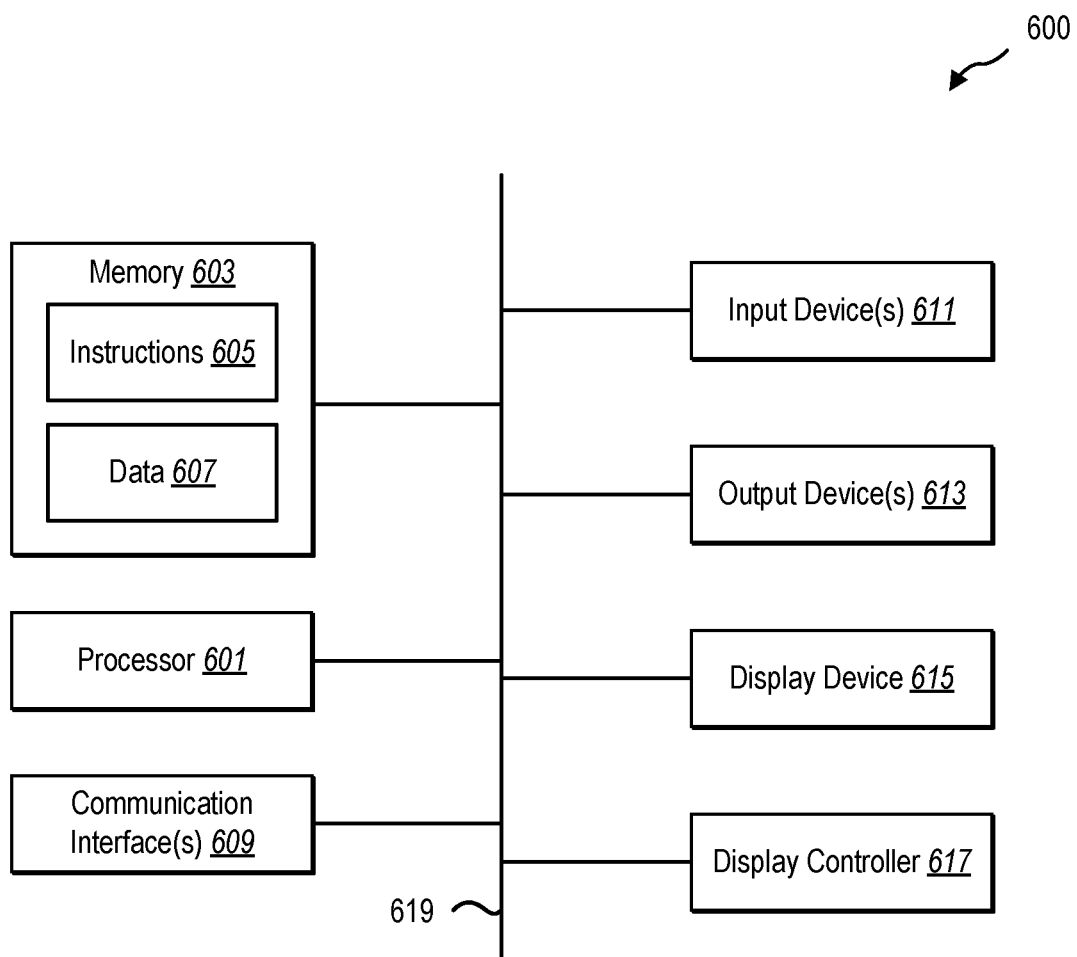
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for coordinating collection of and access to management data in a core network of a telecommunications environment, the method comprising:
   receiving, from a consumer entity, a request for management data associated with management of one or more operations on a telecommunications network, wherein the consumer entity is a network function implemented in the core network of a fifth generation (5G) cellular communication network;
   determining a collection status of the requested management data, the collection status indicating that a first portion of the requested management data has been collected while a second portion of the requested management data has not been previously collected and stored at a management data storage;
   authenticating the consumer entity as an authorized consumer to access the requested management data;
   determining a transport path associated with providing access to the requested management data via a data bus; wherein determining the transport path includes determining a location on the data bus based on one or more of a cost associated with moving the management data to the location or a cost of using the data bus at the location by the consumer entity; and
   causing the management data to be accessible to the consumer entity via the transport path by configuring the transport path by providing instructions to the consumer entity such that the management data is accessible to the consumer entity at the determined location on the data bus.

2. The method of claim 1, wherein determining the transport path is based at least in part on the determined collection status.

3. The method of claim 1, further comprising requesting a management data producer to produce the second portion of the requested management data based on the determined collection status indicating that the second portion of the requested management data has not been previously collected and stored.

4. The method of claim 1, further comprising modifying the request based on the determined collection status indicating that the second portion of the requested management data has not been previously collected and stored, wherein modifying the request includes generating a modified request in which the first portion of the management data that has been collected and stored is excluded from the request.

5. The method of claim 1, wherein determining the location on the data bus is based on a location of the consumer entity.

6. The method of claim 1, wherein the location on the data bus refers to a location on an edge server of an on-premise portion of the data bus.

7. The method of claim 1, wherein causing the management data to be accessible comprises providing the consumer entity access to the management data via a standardized API that provides access to the management data via the data bus.

8. The method of claim 1, wherein the management data includes external management data.

9. The method of claim 1, wherein the management data includes at least one of:
   unprocessed management data;
   machine learning model based on the unprocessed management data;
   report created using unprocessed management data; or
   analytics data performed on the unprocessed management data.

10. The method of claim 1, wherein the request includes:
    a request for internal management data comprising data associated with management and orchestration of the telecommunications network that is defined by a 3GPP standard; or
    a request for external management data including data associated with management and orchestration of the telecommunications network not explicitly defined by 3GPP.

11. A system, comprising:
    at least one processor;
    memory in electronic communication with the at least one processor; and
    instructions stored in the memory, the instructions being executable by the at least one processor to:
       receive, from a consumer entity, a request for management data associated with management of one or more operations on a telecommunications network, wherein the consumer entity is a network function implemented in a core network of a fifth generation (5G) cellular communication network;
       determine the collection status of the requested management data, the collection status indicating that a first portion of the requested management data has been collected while a second portion of the requested management data has not been previously collected and stored at a management data storage;
       authenticate the consumer entity as an authorized consumer to access the requested management data;
       determine a transport path associated with providing access to the second portion of the requested management data via a data bus; and wherein determining the transport path includes determining a location on the data bus based on one or more of a cost associated with moving the management data to the location or a cost of using the data bus at the location by the consumer entity; and
       cause the management data to be accessible to the consumer entity via the transport path by configuring the transport path by providing instruction to the consumer entity such that the management data is accessible to the consumer entity at the determined location on the data bus.

12. The system of claim 11, wherein determining the transport path is based on the determined collection status.

13. The system of claim 11, further comprising instructions being executable by the at least one processor to:
request a management data producer to produce the second portion of the requested management data based on the determined collection status.

14. The system of claim 11, wherein determining the location on the data bus is based on a location of the consumer entity.

15. A non-transitory computer readable medium storing instructions thereon that, when executed by at least one processor, causes a computing device to:
receive, from a consumer entity, a request for management data associated with management of one or more operations on a telecommunications network, wherein the consumer entity is a network function implemented in a core network of a fifth generation (5G) cellular communication network;
determine a collection status of the requested management data, the collection status indicating that a first portion of the requested management data has been collected while a second portion of the requested management data has not been previously collected and stored at a management data storage;
authenticate the consumer entity as an authorized consumer to access the requested management data;
determine a transport path associated with providing access to the second portion of the requested management data via a data bus; and wherein determining the transport path includes determining a location on the data bus based on one or more of a cost associated with moving the management data to the location of a cost of using the data bus at the location by the consumer entity; and
cause the management data to be accessible to the consumer entity via the transport path by configuring the transport path by providing instructions to the consumer entity such that the management data is accessible to the consumer entity at the determined location on the data bus.

16. The method of claim 1, wherein the management data includes performance management data.

17. The method of claim 1, wherein the management data includes key performance indicators.

18. The method of claim 1, wherein the management data includes trace information.

19. The method of claim 1, wherein the management data includes radio access network (RAN) data.

* * * * *